July 19, 1960 — D. BLOSSER — 2,945,607
MATERIAL HANDLING DEVICE
Filed April 29, 1958 — 3 Sheets-Sheet 1

INVENTOR.
Dwight Blosser
BY Victor J. Evans & Co.
ATTORNEYS

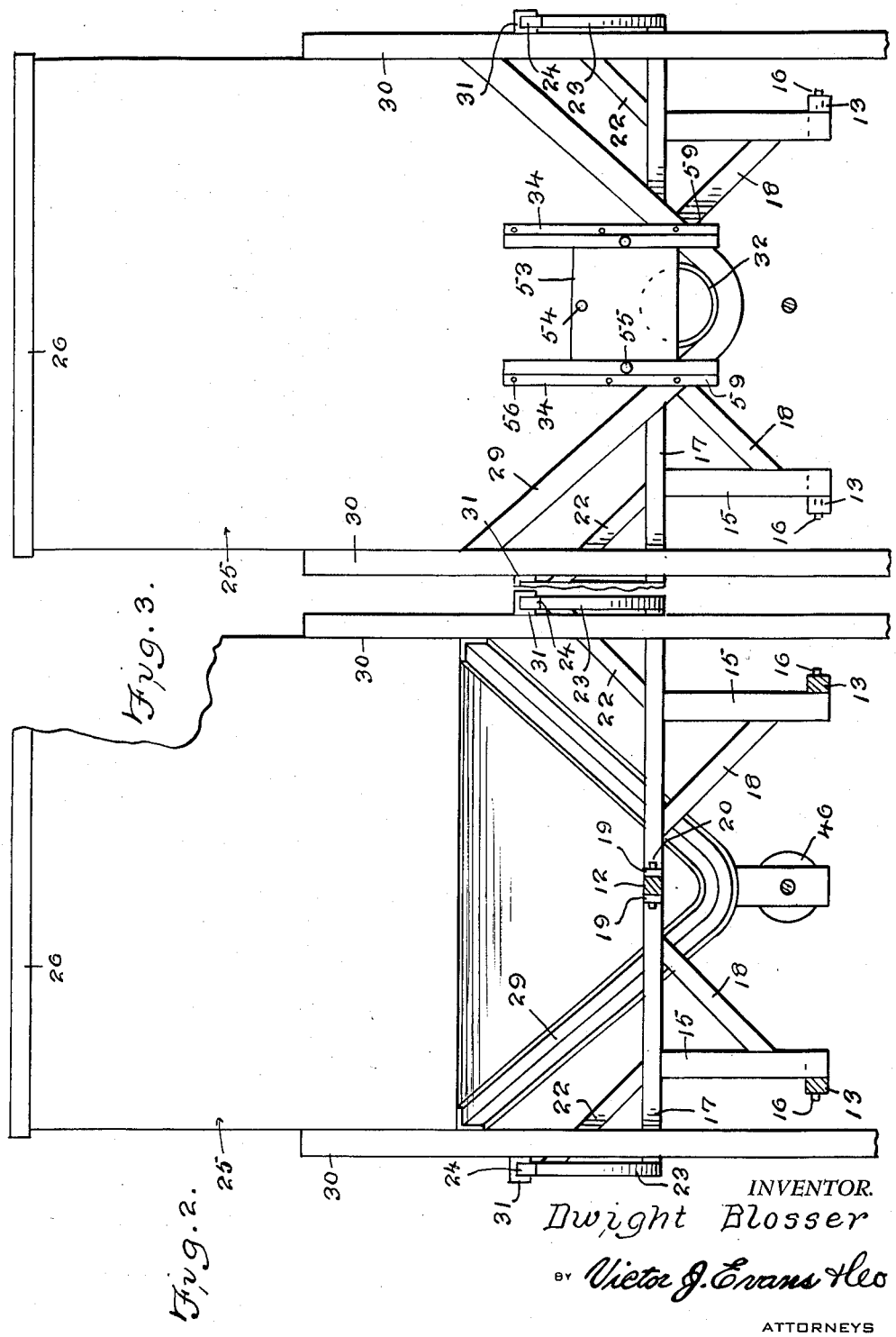

July 19, 1960

D. BLOSSER 2,945,607

MATERIAL HANDLING DEVICE

Filed April 29, 1958

INVENTOR.
Dwight Blosser

BY *Victor J. Evans & Co.*

ATTORNEYS

United States Patent Office 2,945,607
Patented July 19, 1960

2,945,607
MATERIAL HANDLING DEVICE

Dwight Blosser, Blosser Turkey Farms, Wellman, Iowa

Filed Apr. 29, 1958, Ser. No. 731,745

3 Claims. (Cl. 214—83.26)

This invention relates to a device for use in handling material such as bulk material which may be grain or the like.

The object of the invention is to provide a material handling device which is in the nature of a framework that supports a hopper or housing which is adapted to hold a quantity of material such as grain therein, and wherein a hitch is provided so that the hopper can be conveniently lifted up and moved from place to place by means of a conventional tractor.

Another object of the invention is to provide a material handling device which is especially suitable for use on farms or other localities, and wherein one tractor can be used for manipulating or operating or moving a plurality of separate hoppers which may contain different types of material therein, and wherein the tractor can also be used for supplying motive force for operating an auger or conveyor which may be used for emptying the hopper.

A further object of the invention is to provide a material handling device which is extremely simple and inexpensive to manufacture.

Other objects and advantages will be apparent during the course of the following description.

In the accompanying drawings, forming a part of this application, and in which like numerals are used to designate like parts throughout the same:

Figure 2 is a vertical sectional view illustrating the material handling device, and taken at right angles to the view shown in Figure 1.

Figure 3 is a view looking at the opposite side from Figure 2, and showing a modification wherein a door or closure is used instead of an auger or conveyor.

Figures 1, 4, 5:
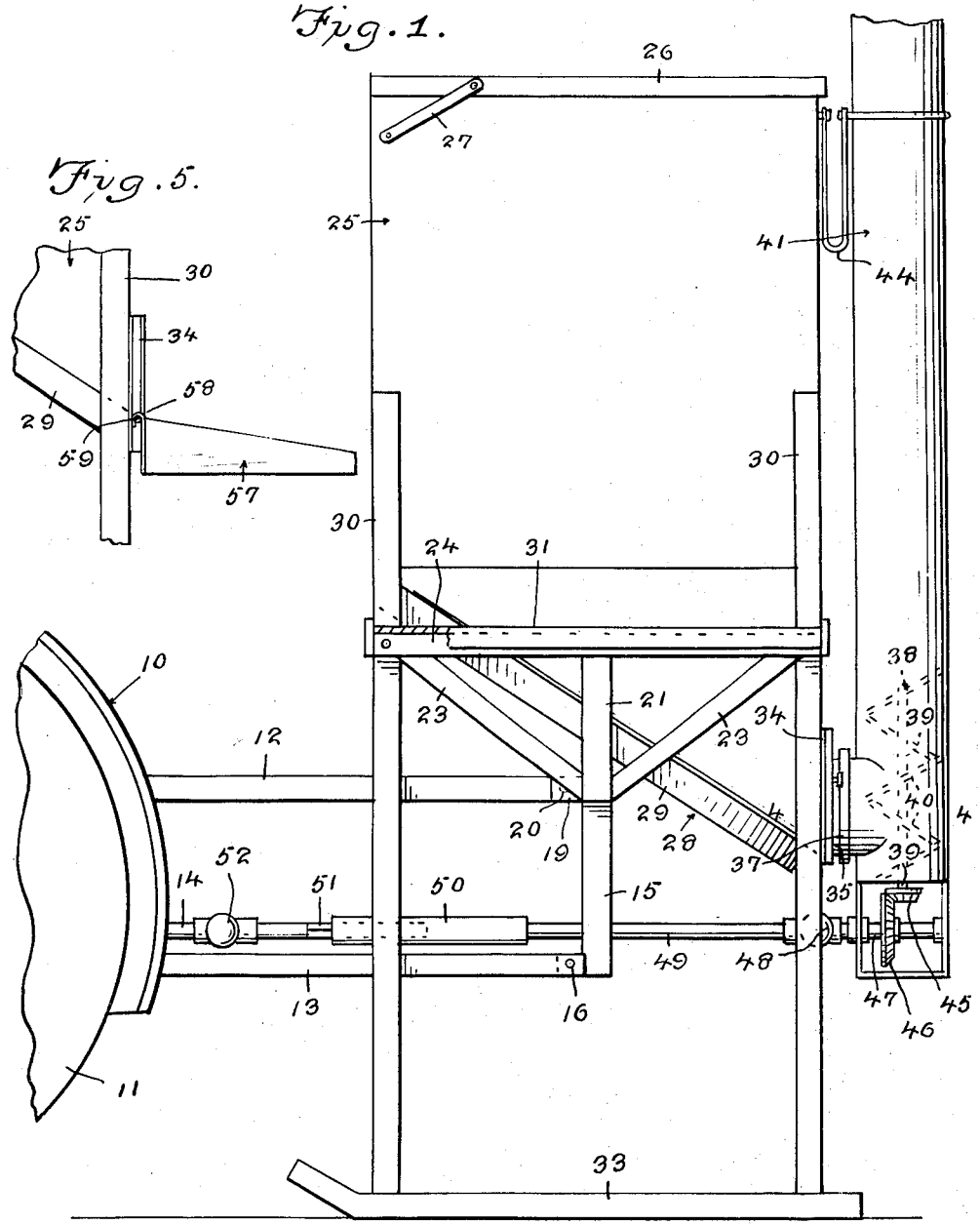
Figure 1 is a side elevational view illustrating the material handling device of the present invention.
Figure 4 is a sectional view taken on the line 4—4 of Figure 1.
Figure 5 is a fragmentary elevational view illustrating a further modification wherein a discharge spout is used instead of the auger.
Figure 6:
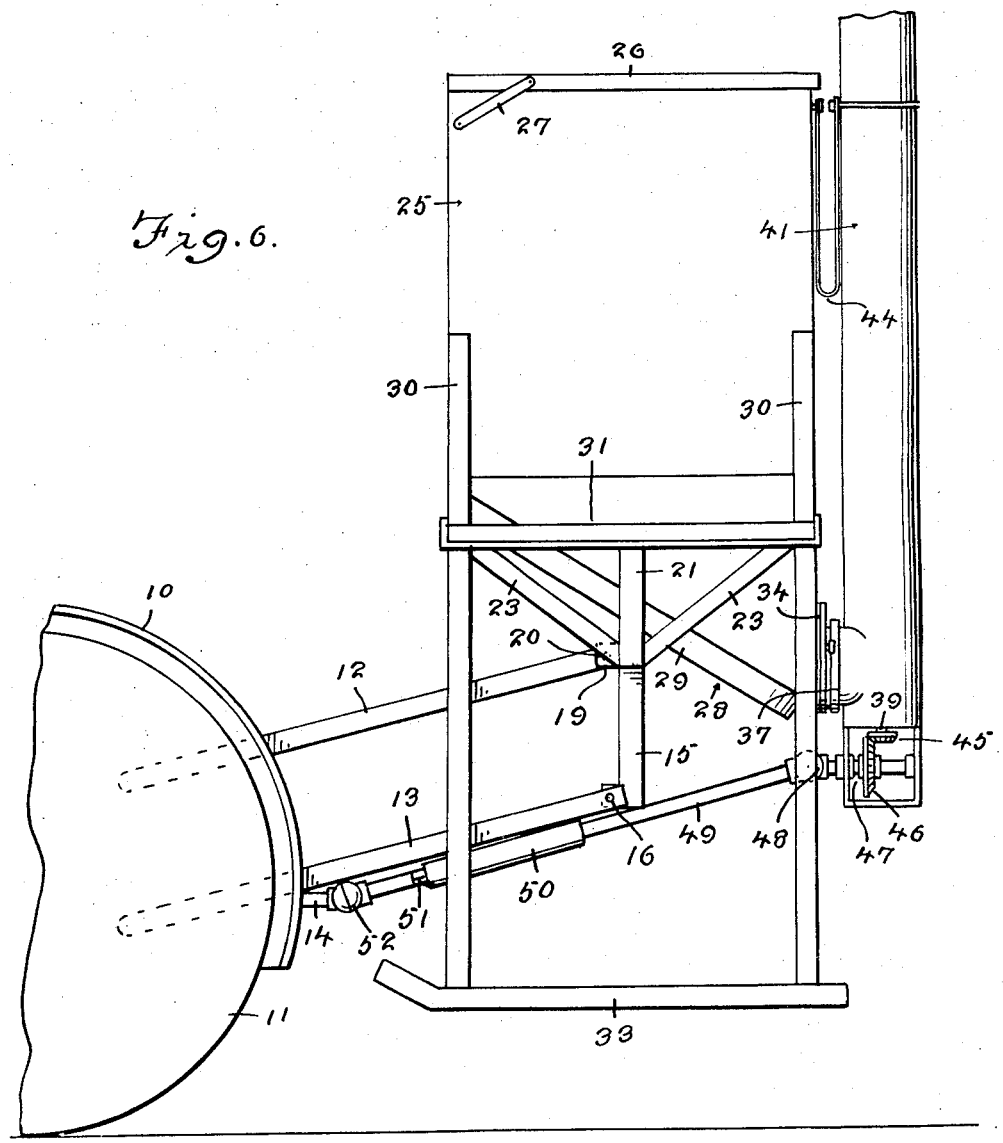
Figure 6 is a view similar to Figure 1, but showing the parts in raised or lifted position.

Referring in detail to the drawings, the numeral 10 indicates the rear portion of a conventional tractor which includes rear wheels 11, and extending rearwardly from the rear of the tractor 10 is an upper lift arm 12 and a pair of lower lift arms 13, and these arms 12 and 13 are adapted to be moved up and down by the usual lift mechanism on the tractor which may be hydraulically operated or controlled. Also extending rearwardly from the tractor 10 is a power take-off shaft 14, Figure 1.

According to the present invention, there is provided a pair of vertically disposed spaced parallel posts 15 which have their lower ends pivotally connected to the lower arms 13 by means of pivot pins 16, Figure 2. The numeral 17 indicates a horizontally disposed beam which is secured to the upper ends of the posts 15 in any suitable manner, and there is further provided a pair of inclined braces 18 which have their lower ends secured to the posts 15, while the upper ends of the braces 18 are secured to the beam 17. Ears 19 extend forwardly from the beam 17, and a pivot pin 20 serves to pivotally connect the rear end of the arm 12 to the ears 19.

Extending upwardly from each end of the beam 17 is a vertically disposed support piece 21, and the numeral 22 designates inclined braces which extend between the support pieces 21 and the beam 17 and the braces are secured in place to these pieces or members, in any suitable manner. There is further provided pairs of angularly arranged support members 23 which have their lower ends secured to the bottom of the support pieces 21, and the present invention further includes a pair of horizontally disposed spaced parallel bars 24. These bars 24 are secured in any suitable manner to the upper ends of the support members 23 and support pieces 21, for a purpose to be later described.

The numeral 25 indicates in Figure 1 a hollow housing or hopper which is provided with a lid 26 that is mounted for movement into and out of opening and closing relation with respect to the upper end of the hopper 25, and the lid 26 is connected in place by means of links or a hinge connection 27, Figure 1. The lower portion of the housing 25 is inclined as at 28 so that grain or other material in the hopper 25 will have a tendency to flow by gravity towards an outlet opening or discharge opening 32 which is arranged in the lower rear portion of the hopper. The numeral 29 indicates a Z-shaped angle iron which is arranged adjacent the lower portion 28 of the hopper 25.

There is furthere provided a plurality of spaced parallel vertically disposed uprights or posts 30, and these uprights 30 are secured to the hopper 25 in any suitable manner, as for example by welding. The numeral 31 designates a pair of U-shaped body members which are secured to the uprights 30 in any suitable manner, as for example by welding. These body members 31 are adapted to selectively receive therein the bars 24 when the tractor 10 is properly positioned. Runners 33 are secured to the lower ends of the uprights 30, as for example as shown in Figure 1.

As shown in Figure 4 for example, there is provided a pair of spaced parallel tracks 34 which are secured to the lower rear portion of the hopper 25 on opposite sides of the outlet opening 32, and the numeral 35 indicates a sleeve which has flanges 36 that engage the tracks 34. An auger or conveyor 41 has a portion 37 swivelly connected to a flange 43 of the sleeve 35 so that the auger 41 can be shifted to different angular positions whereby grain or the like may be discharged from the auger into different areas or locations. The member 41 is provided with a spiral lift 38 which includes a shaft 39 and a spiral blade 40. As shown in Figure 1 for example, a connector 44 may be provided for helping to retain the auger 41 in proper position, and the connector 44 may be in the nature of a chain, cable or the like.

A means is provided for operating the auger 41 from the power take-off shaft 14 of the tractor 10, and this means comprises a bevel gear 45 on an end of the shaft 39, Figure 1. The bevel gear 45 on the lower end of the shaft 39 meshes with a bevel gear 46 on a shaft 47, and the shaft 47 is connected to a universal joint 48, there being a shaft 49 extending between a coupling 50 and and the universal joint 48. A shaft 51 connects the coupling 50 to a universal joint 52 which is arranged at the rear end of the power take-off shaft 14.

Instead of mounting the auger 41 as shown in Figures 1 and 4 for example, a closure or door 53 may be used, as for example as shown in Figure 3. The door 53 is slidably mounted in the tracks 34, and a handle 54 may be provided for raising and lowering the door 53. Securing elements 55 may be provided for retaining the door 53 immobile in its adjusted positions, and by raising or lowering the door 53, the effective size of the outlet opening 32 can be controlled so that the amount of material discharging out through the opening 32 can be regulated or controlled as desired. The tracks 34 are permanently affixed to the lower rear portion of the hopper in any suitable manner, as for example by means of securing elements 56.

In Figure 5 there is illustrated a further modified arrangement wherein an outlet spout 57 may be used in lieu of the auger 41, and the spout 57 is provided with hooks 58 for engagement with pins 59 so that material from the opening 32 can pass over the spout 57 and into a suitable receptacle or the like.

It is to be understood that suitable braces can be provided or used wherever desired or required, and said braces can help provide a means of steadying or supporting the device.

From the foregoing, it is apparent that there has been provided a material handling device and it will be seen that the hopper 25 can be loaded by raising the lid 26, and this hopper can be loaded in any suitable manner from a suitable source of supply. Any desired type of material may be loaded in the hopper 25, as for example grain or seed may be placed in the hopper. The hopper 25 is supported on the uprights 30, and the lower ends of the uprights 30 have the runners 33 connected thereto. For helping to reinforce the uprights and for helping to support the hopper 25, the horizontally disposed supporting brace 60 is secured to a pair of the uprights 30. It is to be noted that when the hopper is to be moved from one location to another, the tractor 10 is backed into position as for example as shown in Figure 1 so that with the arms 12 and 13 connected to the tractor 10 in the usual manner, it will be seen that the hitch structure including the posts 15, beam 17, and bars 24 can be maneuvered so that the bars 24 will move into engagement with the U-shaped body members 31. These body members 31 are secured in any suitable manner to the uprights 30, and with the bars 24 engaging the body members 31, it will be seen that the usual hydraulic mechanism on the tractor 10 can be actuated so that the arms 12 and 13 can be raised and this will cause the entire assembly including the hopper 25 to be raised so that for example the runners 33 can be lifted up off of the ground, and with the parts in raised position the entire assembly can be moved from one location to another and this is especially convenient on a farm or the like. It is to be noted that as arms 12 and 13 are raised by the usual lifting mechanism on the tractor, the provision of the pivot pins 20 and 16 will permit the posts 15 to move upwardly and as the posts 15 move upwardly, the beam 17 will move up and since the members 21 and 23 are secured to the beam 17, it will be seen that this will result in an upward movement of the pair of bars 24, since the bars 24 are secured in any suitable manner to the upper ends of the members 21 and 23. After the assembly has been moved to its desired location, the arms 12 and 13 can again be returned to lowered position so that the runners 33 will again engage the ground whereby the hopper 25 will be supported by means of the uprights 30 and then by further lowering the arms 12 and 13, the bars 24 will move down out of engagement with the body members 31 so that the tractor 10 can be driven forwardly and completely disengaged from the framework which supports the hopper 25. Thus, one tractor 10 can be used for handling a plurality of separate hoppers 25 since after a hopper 25 has been moved to its desired location, the tractor 10 can be driven to whereever it is needed or desired.

In certain instances the auger 41 may be used. It is to be noted that the material from the hopper 25 is adapted to discharge out through the outlet opening 32 in the lower rear portion of the hopper, and arranged on opposite sides of the opening 32 are the pair of tracks 34. The sleeve 35 has its flanges 36 engaging the tracks 34, and the portion 37 of the auger 41 is swivelly or pivotally connected to the flange 43 of the sleeve 35. This construction permits the auger 41 to pivot or swivel about the opening 32 so that the outlet end of the auger 41 can be arranged in any desired position whereby the feed or grain can be conveyed or emptied into any desired locality or receptacle. The auger 41 includes the conveyor 38 which is rotated by means of the intermeshing gears 45 and 46, and these gears 45 and 46 are driven through the medium of the shaft 47, universal coupling 48, shaft 49, coupling 50, shaft 51 and universal joint 52 so that the power take-off shaft 14 of the tractor 10 can be used for supplying power for the auger. The auger 41 may be retained in place by means of the connector 44.

In certain instances the auger 41 can be removed and the sleeve 35 is detached from the tracks 34, and a door such as the door 53 is slidably connected to the tracks 34. As shown in Figure 3 the door 53 can be raised or lowered so as to control the amount of material discharging out through the opening 32. Furthermore, when desired a spout such as the spout or guide member 57 can be arranged adjacent to the opening 32, as for example when the grain or feed is to be loaded into a basket, receptacle or the like.

Some of the advantages of the present invention are as follows. A person can purchase one hitch and one auger and as many of the bins or hoppers as he needs which hoppers can be set at different places of feeding such as at a hog stable, chicken house, dairy barn or the like. Also a feed dealer can purchase the hoppers and fill them and deliver them to the farmer and the farmer, with the aid of the auger, could use them as he needs them, or by using the small sliding door 53, a wheelbarrow, basket or the like can be filled. The feed and grain unloader of the present invention is adapted to be carried by the tractor three point hitch, that is by means of the three points or arms 12 and 13.

The auger 41 will swing from side to side for unloading due to the construction shown in Figures 1 and 4. Furthermore, the auger can be detached so that the slide 53 can be installed when baskets or the like are being filled. The device can be carried by the tractor to a bulk feed bin and then the hopper can be filled and then the hopper can be carried to a poultry house, hog house or barn or the like and then set on the runners 33 and then the feed can be removed as needed. The feed will stay dry due to the provision of the weatherproof lid 26. Also, the device can be used to fill screen porch feeders, by means of a hand dipper. If desired, the hopper may be supported on adjustable legs.

The grain unloader of the present invention is operated from the power take-off of the tractor 10, and the device is adapted to be carried by the tractor three point hitch.

The parts can be made of any suitable material and in different shapes or sizes.

It will be seen that there has been provide a small grain unloader which is extremely useful around a farm and the device can also be used as a feed mixer and the hopper can be detached or connected to the three point hitch as previously described, whenever desired or required.

Minor changes in shape, size and rearrangement of details coming within the field of invention claimed may be resorted to in actual practice, if desired.

I claim:

1. In combination with a tractor having a power take-off and a pair of lower rearwardly disposed lift arms and an upper lift arm, a pair of spaced parallel vertically disposed posts having their lower ends pivotally connected to said lower arms, a horizontally disposed beam secured to the upper ends of said posts, inclined braces extending between said posts and beam and secured thereto, ears extending forwardly from said beam and pivotally connected to the rear of said upper arm, a vertically disposed support piece extending upwardly from each end of the beam, inclined braces extending between said support pieces and beam and secured thereto, pairs of angularly arranged support members having their lower ends secured to the lower ends of said support pieces, and a pair of horizontally disposed bars secured to the upper ends of said support pieces and support members.

2. In a device of the character described, a pair of spaced parallel vertically disposed posts, a horizontally disposed beam secured to the upper ends of said posts, inclined braces extending between said posts and beam and secured thereto, a vertically disposed support piece extending upwardly from each end of the beam, inclined braces extending between said support pieces and beam and secured thereto, pairs of angularly arranged support members having their lower ends secured to the lower ends of said support pieces, and a pair of horizontally disposed bars secured to the upper ends of said support pieces and support members, a hollow hopper, a lid mounted for movement into and out of opening and closing relation with respect to the top of the hopper, a plurality of vertically disposed spaced parallel uprights secured to said hopper, a horizontally disposed supporting brace secured to certain of said uprights, runners connected to the lower ends of said uprights, and a pair of spaced parallel horizontally disposed U-shaped body members secured to said uprights for selectively receiving said bars.

3. In a device of the character described, a pair of spaced parallel vertically disposed posts, a horizontally disposed beam secured to the upper ends of said posts, inclined braces extending between said posts and beam and secured thereto, a vertically disposed support piece extending upwardly from each end of the beam, inclined braces extending between said support pieces and beam and secured thereto, pairs of angularly arranged support members having their lower ends secured to the lower ends of said support pieces, and a pair of horizontally disposed bars secured to the upper ends of said support pieces and support members, a hollow hopper, a lid mounted for movement into and out of opening and closing relation with respect to the top of the hopper, a plurality of vertically disposed spaced parallel uprights secured to said hopper, a horizontally disposed supporting brace secured to certain of said uprights, runners connected to the lower ends of said uprights, and a pair of spaced parallel horizontally disposed U-shaped body members secured to said uprights for selectively receiving said bars, said hopper including an inclined bottom portion and an outlet opening, a pair of spaced parallel vertically disposed tracks secured to the lower rear portion of the hopper and said tracks being arranged on opposite sides of the outlet opening.

References Cited in the file of this patent

UNITED STATES PATENTS

| | | |
|---|---|---|
| 2,398,585 | Hayward | Apr. 16, 1946 |
| 2,606,676 | Dempster | Aug. 12, 1952 |
| 2,656,034 | Filsinger et al. | Oct. 20, 1953 |
| 2,678,738 | Mangrum | May 18, 1954 |
| 2,849,137 | Hansen | Aug. 26, 1958 |